United States Patent
Nikkeshi

(10) Patent No.: US 6,180,225 B1
(45) Date of Patent: Jan. 30, 2001

(54) TANNIC ACID-ADSORBED SILICON OXIDE USED AS RESIN ADDITIVE

(75) Inventor: Susumu Nikkeshi, Fukushima (JP)

(73) Assignee: Tohoku Munekata Co Ltd, Fukushima-Ken (JP)

(*) Notice: Under 35 U.S.C. 154(b), the term of this patent shall be extended for 0 days.

(21) Appl. No.: 09/166,521

(22) Filed: Oct. 6, 1998

(30) Foreign Application Priority Data

Dec. 17, 1997 (JP) ................................................ 9-363698

(51) Int. Cl.[7] .................................................. B32B 5/16
(52) U.S. Cl. ............................................ 428/331; 428/404
(58) Field of Search ............................... 428/323, 331, 428/403, 404

(56) References Cited

U.S. PATENT DOCUMENTS

| 4,407,863 | * | 10/1983 | Yui et al. | 427/213 |
| 4,500,554 | | 2/1985 | Weetall . | |
| 4,504,614 | | 3/1985 | Padget . | |
| 5,132,136 | * | 7/1992 | Sato et al. | 426/493 |
| 5,213,895 | * | 5/1993 | Hirai et al. | 428/403 |
| 5,789,467 | * | 8/1998 | Michos | 523/116 |
| 5,863,695 | * | 1/1999 | Tanikawa et al. | 430/126 |

FOREIGN PATENT DOCUMENTS

| 0818502 | 1/1998 | (EP) . |
| 0838494 | 4/1998 | (EP) . |

* cited by examiner

Primary Examiner—Hao T. Le

(57) ABSTRACT

The present invention relates to silicon oxide having tannic acid adsorbed thereon, which is used as a degradation-preventing additive for a thermoplastic resin. This can be obtained by treating 100 parts by weight of silicon oxide with a solution containing 0.5 to 8.0 parts by weight of tannic acid to allow tannic acid to be adsorbed thereon. A reduction (degradation) in a molecular weight of a thermoplastic resin brought about by hydrolysis caused by moisture for a long period of time or thermal decomposition in molding can be inhibited by adding 0.2 to 3.4 % of the tannic acid-adsorbed silicon oxide thus obtained to a thermoplastic resin.

9 Claims, 3 Drawing Sheets

TANNIC ACID-ADSORBED SILICON OXIDE USED AS RESIN ADDITIVE

BACKGROUND OF THE INVENTION

1. Field of the Invention

The present invention relates to silicon oxide on which tannic acid being a polyhydric phenol compound is adsorbed, which is used as a so-called degradation preventive for preventing a thermoplastic resin from being decomposed to decrease in a molecular weight by adding to the thermoplastic resin.

2. Description of the Related Art

In general, thermoplastic resins such as polycarbonate, polyester and polyolefin, particularly polycarbonate base resins are decomposed by hydrolysis caused by moisture for a long period of time or heating in molding to decrease in a molecular weight, and this results in lowering in various dynamic properties. Because of performances thereof, a polycarbonate resin is used in many cases in such uses that heat resistance and mechanical dynamic properties are required. Accordingly, a reduction in the molecular weight caused by a change with the passage of time, heating, kneading and the like not only has caused the use purposes thereof to be lost in many cases but also has made it difficult to recycle the molded articles.

SUMMARY OF THE INVENTION

An object of the present invention is to provide tannic acid-adsorbed silicon oxide prepared by allowing tannic acid to be adsorbed on silicon oxide by making use of a hydroxyl group contained in tannic acid, which inhibits a degradation of a thermoplastic resin caused by a reduction in the molecular weight brought about by thermal decomposition of the thermoplastic resin by adding to the thermoplastic resin to maintain the dynamic properties thereof and makes it possible to provide a resin showing excellent recycling.

DETAILED DESCRIPTION OF THE INVENTION

As described above, it has been found that the preceding object of the present invention can be achieved by silicon oxide having tannic acid adsorbed thereon and by adding said silicon oxide to a thermoplastic resin. Next, the present invention shall be explained in further detail.

Intensive researches of surface treatment of various materials with tannic acid continued by the present inventors over a long period of time have resulted in completing an invention for preventing a reduction in the molecular weight of a thermoplastic resin by adding silicon oxide having tannic acid adsorbed thereon to the thermoplastic resin. That is, according to the present invention, a reduction in the molecular weight of the resin can be inhibited by allowing tannic acid to be adsorbed on silicon oxide and adding this tannic acid-adsorbed silicon oxide to the thermoplastic resin.

Silicon oxide used in the present invention may be natural or synthetic. It is said that the natural product contains a lot of impurities and has a dispersed quality, but it is inexpensive and is excellent in profitability. The synthetic product has an excellent quality but is expensive. In the present invention, silicon oxide may be synthetic or natural or a mixture thereof and can freely be selected considering an economical part. At present, natural silicon oxide is obtained in various places in the world and produced in the forms of opal, feldspar, quartz and quartz crystal. Natural silicon oxide is used for a glass material, an abrasive and synthetic ceramics. In the present invention, these naturally produced silicon oxides may be pulverized or molten by heating and pulverized again. Silicon oxide preferably used in the present invention includes silicate glass, silicic acid anhydride and silica gel, and they are used in the form of powder.

The particle diameter of silicon oxide shall not specifically be restricted and is suitably selected according to use purposes.

In the present invention, tannic acid is preferably bonded to silicon oxide by treating 100 parts by weight of silicon oxide with a tannic acid aqueous solution containing 0.5 to 8.0 parts by weight of tannic acid. Next, tannic acid used in the present invention is expressed synonymously with tannin such as pentaploid tannin in many cases, and tannin is not distinguished strictly from tannic acid in the present invention. Tannic acid used in the present invention means a polyhydric phenol compound forming gallic acid shown by the following formula (1) by hydrolysis. In recent years, it has been made clear that in ordinary tannic acid, for example, pharmacopoeial tannic acid (Chinesegal lotannin), eight gallic acid groups are disposed in the circumference of a glucose residue and on the same plane thereof as shown in a formula (2) and further two gallic acid groups are bonded in a vertical direction [site marked by * in the formula (2)] [J. Shore: J. Soc. Dyers Colorists, 87, 3 (1971)].

However, the central part of the compound shall not necessarily be restricted to glucose and may be a cellulose base compound. Further, didepside of gallic acid represented by a formula (3) obtained by hydrolysis of tannic acid can be used as well.

Thus, tannic acid is a compound contained widely in plants in the nature, and therefore it can easily be anticipated that tannic acid includes compounds having partially different chemical structures.

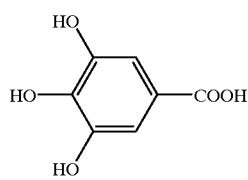

(1)

-continued

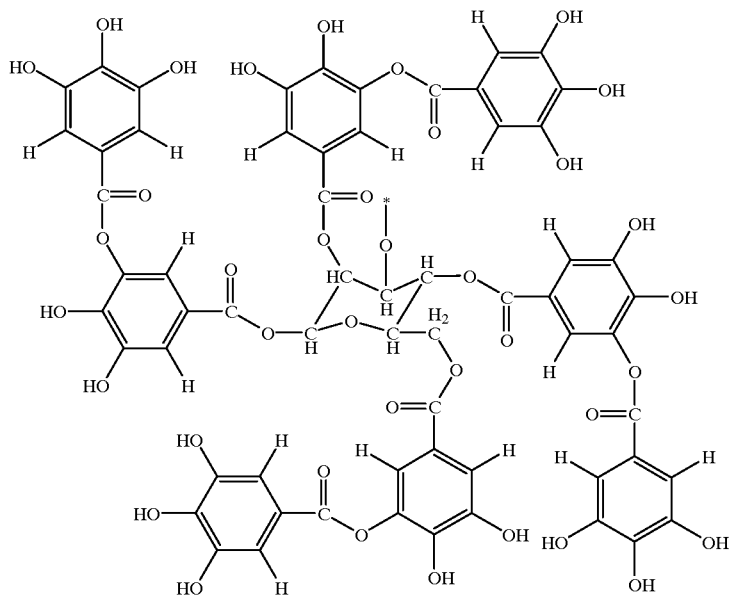

(2)

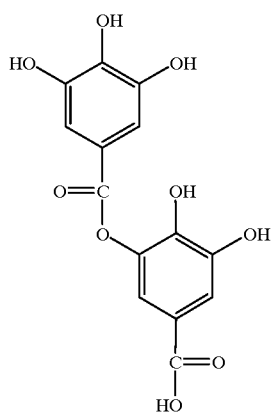

(3)

At present, uses of tannic acid include an ink additive, an anastaltic for pharmaceutical uses and a fixative for dyes and a tanning agent for leathers for industrial uses. A polyhydric phenol compound having a dye-fixing effect and a tanning effect of leathers is called "synthetic tannin". In the present invention, among synthetic tannins, compounds which are effectively used as a matter of course for the object of the present invention can be used as well. Tannic acid is dissolved very well in various solvents, and therefore various solutions of high concentrations can be prepared. Solvents used in the present invention include water, lower alcohols, tetrahydrofuran, toluene, benzene, acetophenone, various ketones and ethers. Water and alcohols are preferably used. The concentration of a tannic acid solution used in the present invention shall not specifically be restricted as long as it is lower than a saturated concentration of tannic acid at a temperature in allowing it to be adsorbed on silicon oxide, and any concentrations can be used. A temperature in allowing tannic acid to be adsorbed on silicon oxide shall not specifically be restricted and is usually a room temperature.

Tannic acid is used in the form of a solution containing 0.5 to 8 parts by weight, preferably 1.0 to 5.0 parts by weight of tannic acid per 100 parts by weight of silicon oxide to be treated. The tannic acid-adsorbed silicon oxide of the present invention is produced by adding silicon oxide to such solution of tannic acid and stirring to allow almost all of tannic acid to be adsorbed and bonded and then filtering, washing and drying silicon oxide having tannic acid adsorbed thereon.

If the amount of tannic acid is less than 0.5 part by weight per 100 parts by weight of silicon oxide, an effect of inhibiting a thermoplastic resin from being decomposed is small, and if it exceeds 8 parts by weight, a capacity of silicon oxide adsorbing tannic acid is saturated, and silicon oxide can not adsorb more tannic acid. Further, tannic acid which has physically been adsorbed produces a lot of decomposed matters in the resin and can not inhibit the resin from being decomposed. Accordingly, it can be understood that such is meaningless.

If the amount of silicon oxide having tannic acid adsorbed thereon which is added to the resin is less than 0.2% by weight, the effect is small. In contrast with this, if the tannic acid-adsorbed silicon oxide exceeding 3.4% by weight is added to the resin, the proportion of silicon oxide occupied in the resin increases, and a lot of discontinuous layers between the resin and silicon oxide are formed, which results in reducing the dynamic characteristics. Accordingly, such is not preferred. The reason why tannic acid-adsorbed silicon oxide inhibits a reduction in the molecular weight of a thermoplastic resin is not certain and is supposed due to that the hydroxyl groups of tannic acid absorb an energy of radical molecules formed when a thermoplastic resin is thermally decomposed. Further, it is considered that since the hydroxyl groups of tannic acid are very susceptible to decomposition, they are usually decomposed before a thermoplastic resin reaches a processing temperature, but they can remain present at temperatures close to the molding temperature of the resin by adsorbing on the surface of silicon oxide by virtue of hydrogen bond. It is considered that this makes it possible to absorb the molecular energy of the radicals. However, the present invention shall not be restricted by such theory.

The tannic acid-adsorbed silicon oxide thus obtained prevents a reduction in the molecular weight of thermoplastic resins, particularly a polycarbonate resin to become an excellent additive.

EFFECTS OF THE INVENTION

The tannic acid-adsorbed silicon oxide of the present invention can prevent a reduction in the molecular weight of thermoplastic resins, particularly a polycarbonate resin. Accordingly, the addition of the tannic acid-adsorbed silicon oxide of the present invention to the thermoplastic resin prevents the dynamic characteristics of the thermoplastic resin from being reduced and makes it possible to recycle the thermoplastic resin, which has so been difficult due to a reduction in the molecular weight.

EXAMPLES

The present invention shall be explained below in further detail with reference to examples and comparative examples.

Example 1

Figure 1:
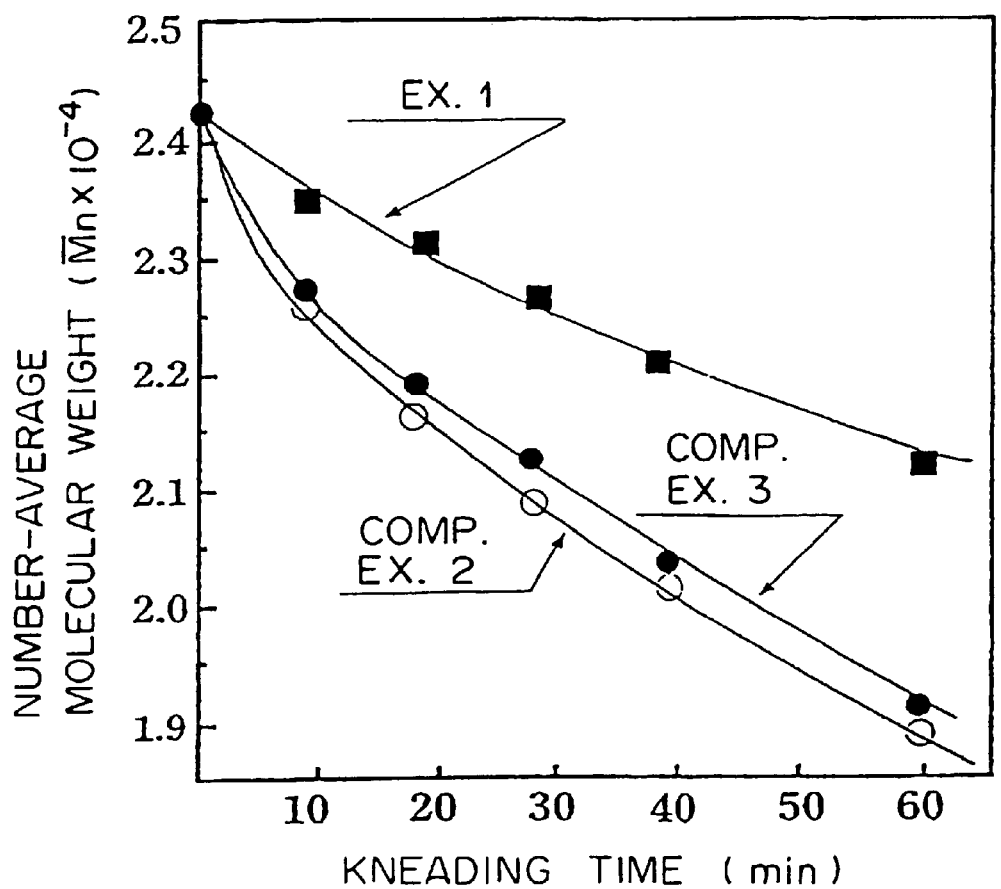
FIG. 1 shows the respective molecular weights of the thermoplastic resins in Example 1, Comparative Example 2 and Comparative Example 3 by kneading time.

Silicon oxide grains (IMSIL A-25 manufactured by Unimin Speciality Minerals Inc.; average grain diameter: 3.5 $\mu$m; density: 2.65 g/cm$^3$) were put in a stainless vat and left for standing in a dryer at 160° C. for 24 hours. They were naturally cooled down to 80° C. and then stored in a polyethylene wide-mouthed bottle without delay. Pure water of 500 ml was put in a 1 liter beaker, and 3 g of tannic acid (pharmacopoeial tannic acid manufactured by Komuro Chemical Co., Ltd.) was dissolved therein. Dried silicon oxide of 100 g was put therein, and stirring with a glass bar was applied for 20 minutes. Next, this was filtered by vacuum, washed with pure water and then dried in a vacuum desiccator for 48 hours to obtain tannic acid-adsorbed silicon oxide. Then, 49.0 g of a polycarbonate resin (Panlite L1250 manufactured by Teijin Co., Ltd., hereinafter referred to as PC) and 1.0 g of tannic acid-adsorbed silicon oxide were put in a plastometer (Plastocoder Model 30C-150 manufactured by Toyo Seiki Co., Ltd.) which was adjusted in advance to 280° C. and kneaded on a condition of a revolution of 32 rpm for one hour. During then, a small amount of a sample for measurement was taken by every 10 minutes to obtain a molecular weight-measuring sample. In measuring the molecular weight, a conical flask equipped with a ground stopper was charged with tetrahydrofuran (THF) and a sample so that the concentration became 0.05 wt % and left for standing in a room for a whole day and night to dissolve the sample. This was filtered by means of a microfilter (GL Choromatodisk 13N, nonaqueous, manufactured by Kurashiki Boseki Co., Ltd.) to filter off and remove silicon oxide grains, and thus a PC molecular weight-measuring sample was obtained. The molecular weight was determined at a temperature of 35° C. by means of GPC Model L700 manufactured by Hitachi Ltd. using a column GL-A14OS. The detector was RI (L7490). THF was used for a carrier solvent, and controlled were the flow velocity to 0.5 ml/min and the pressure to 9.0 kg/cm$^2$. The results thereof are shown in FIG. 1.

Example 2

Figure 2:
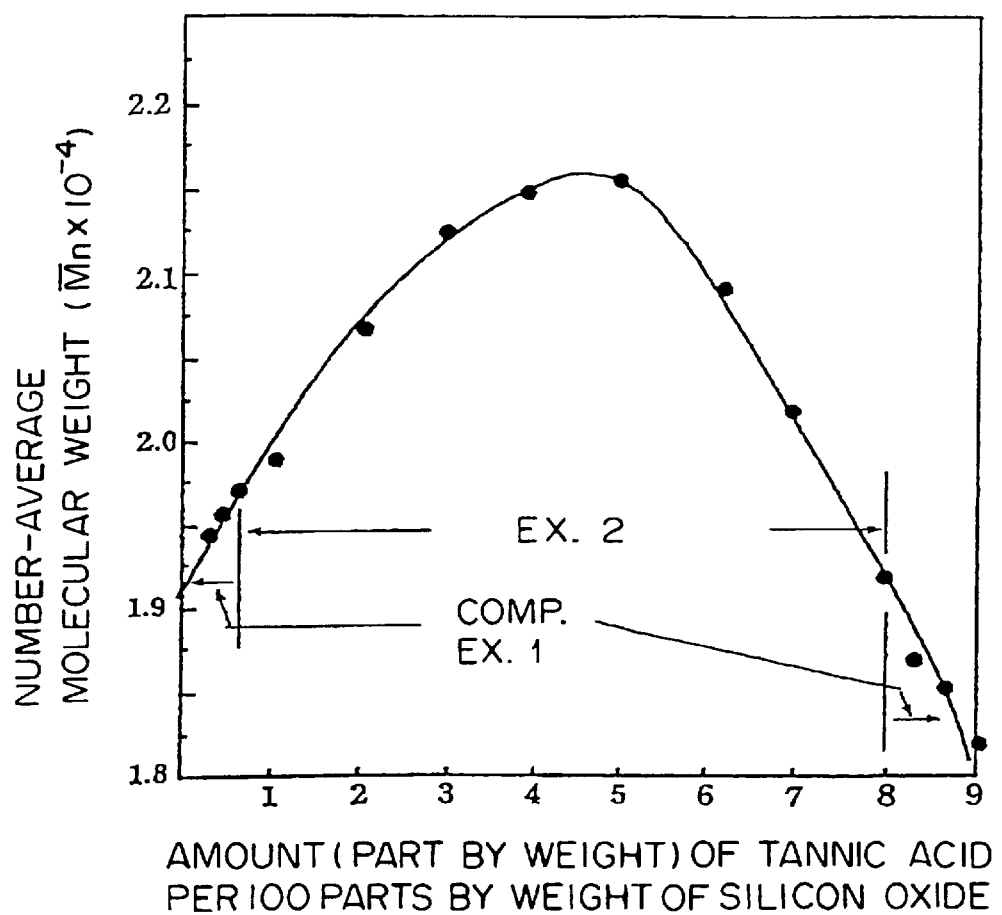
FIG. 2 shows a change in the molecular weight of a polycarbonate resin in Example 2 and Comparative Example 1.

The same procedure as in Example 1 was repeated, except that silicon oxide was treated with a tannic acid aqueous solution in which the amount of tannic acid per 100 parts by weight of silicon oxide was changed in a range of 0.5 to 8.0 parts by weight. In this case, a change in the molecular weight of PC after a kneading time of 60 minutes is shown in FIG. 2.

Comparative Example 1

The same procedure as in Example 2 was repeated, except that the amount of tannic acid contained in the tannic acid aqueous solution was changed to 0.3, 0.4, 8.2 and 8.5 parts by weight per 100 parts by weight of silicon oxide. The results thereof are shown altogether in FIG. 2. It can be found from this that the amount of less than 0.5 part by weight can not inhibit a reduction in the molecular weight and that on the other hand, the amount exceeding 8 parts by weight can not provide the preferred results.

Comparative Example 2

The same procedure as in Example 1 was repeated, except that silicon oxide which was not treated with tannic acid was used. The results thereof are shown altogether in FIG. 1. It is well understood that the molecular weight is reduced to a large extent.

Comparative Example 3

The same procedure as in Example 1 was repeated to prepare a sample, except that in kneading with the plastocoder, only the PC resin of 50 ml was charged without adding silicon oxide. The results thereof are shown altogether in FIG. 1. As can be found from this, a reduction in the molecular weight of the resin is accelerated with the resin alone.

Example 3

Figure 3:
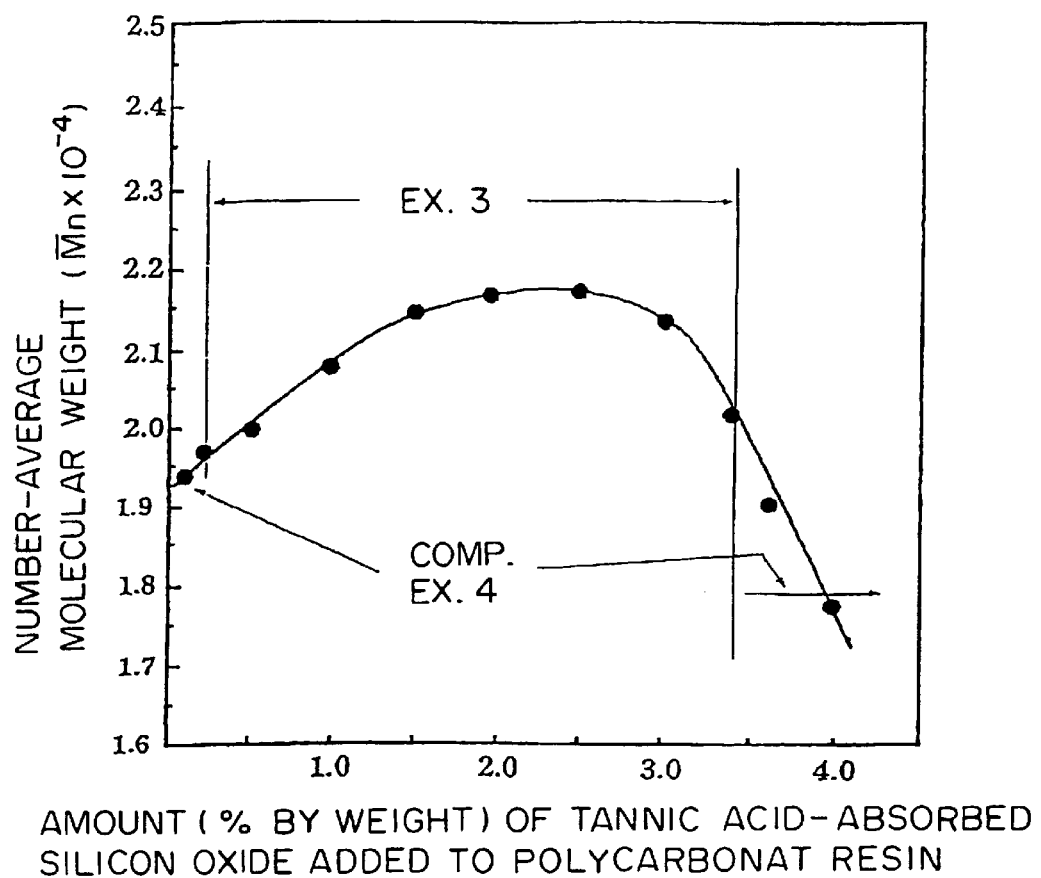
FIG. 3 shows a change in the molecular weight of a polycarbonate resin in Example 3 and Comparative Example 4.

The same procedure as in Example 1 was repeated to measure a molecular weight, except that the amount of tannic acid-adsorbed silicon oxide was changed to 0.2 to 3.4% by weight. The results thereof are shown altogether in FIG. 3. As can be found from this, a reduction in the molecular weight of PC can be controlled by adding tannic acid-adsorbed silicon oxide.

Comparative Example 4

The same procedure as in Example 2 was repeated to measure the molecular weight of PC, except that the amount of tannic acid-adsorbed silicon oxide added to PC was changed to 0.1 and 3.6% by weight. The results thereof are shown altogether in FIG. 3.

What is claimed is:

1. A silicon oxide resin additive having tannic oxide adsorbed thereon, which is prepared by treating 100 parts by weight of silicon oxide with a solution containing 0.5 to 8.0 parts by weight of tannic acid.

2. The silicon oxide having tannic oxide adsorbed thereon as described in claim 1, wherein the silicon oxide is a powder and is treated with the solution containing tannic acid and the tannic acid is selected from the group consisting of silicon glass, silicic acid anhydrous and silica gel.

3. A method of inhibiting a reduction in the molecular weight of thermoplastic resin which comprises adding to the thermoplastic resin the silicon oxide having tannic acid adsorbed thereon described in claim 1, wherein the silicon oxide is added to the thermoplastic resin in an amount of 0.2 to 3.4% by weight.

4. The method of claim 3 of inhibiting a reduction in the molecular weight of thermoplastic resin which comprises adding to the thermoplastic resin the silicon oxide having the tannic acid adsorbed thereon to the thermoplastic resin in an amount of 1 to 3% by weight.

5. The method of claim 3 of inhibiting a reduction in the molecular weight of thermoplastic resin wherein the thermoplastic resin is polycarbonate resin.

6. The silicon oxide resin additive of claim 1 having tannic acid adsorbed thereon, which is prepared by treating 100 parts by weight of silicon oxide with a solution containing 1 to 5 parts by weight of tannic acid.

7. A thermoplastic resin containing a molecular weight reduction amount of the silicon oxide having tannic acid adsorbed thereon as described in claim 1, wherein the silicon oxide is present in an amount of 0.2 to 3.4% by weight.

8. The thermoplastic resin of claim 7 wherein the silicon oxide is present in an amount of 1 to 3% by weight.

9. The thermoplastic resin of claim 7 wherein the thermoplastic resin is polycarbonate resin.

* * * * *